United States Patent Office 2,872,324
Patented Feb. 3, 1959

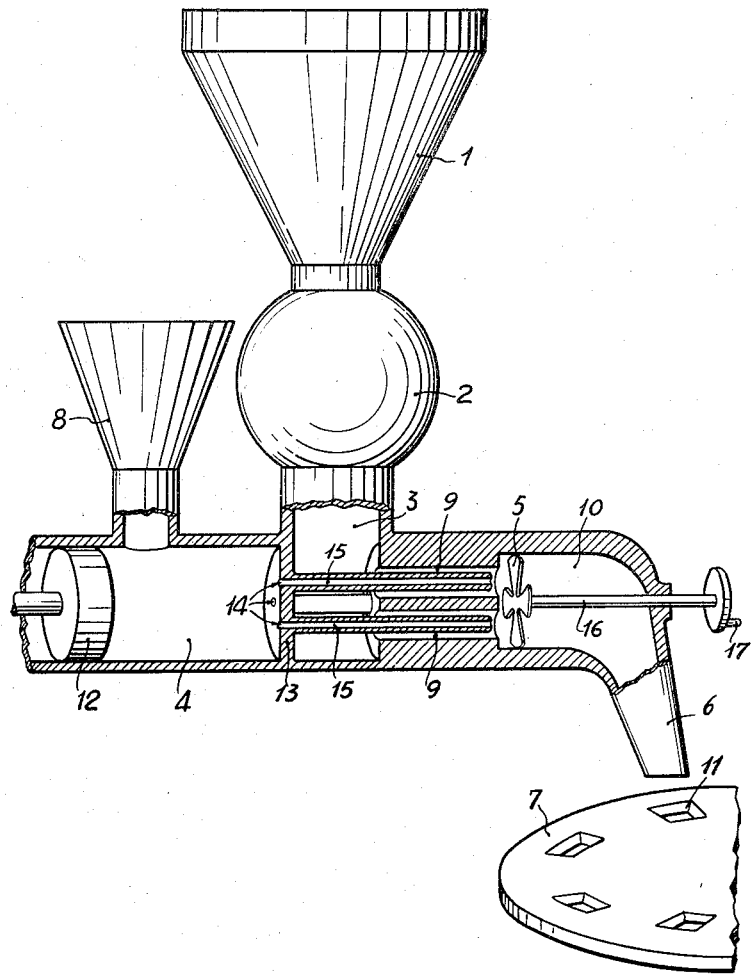

2,872,324

MOLTEN CHEESE, CONTAINING FILAMENTS OF GREEN ORGANIC SUBSTANCES, AND A PROCESS FOR ITS PRODUCTION

Ercole Locatelli, Robbio, Lomellina, Italy

Application November 10, 1953, Serial No. 391,329

Claims priority, application Italy January 22, 1953

2 Claims. (Cl. 99—115)

This invention relates to cheeses and to methods for producing the same.

The difficulties inherent in disbursing filaments in cheese or, in other words, producing a marbleized cheese have never heretofore been satisfactorily overcome.

It is accordingly an object of the invention to provide an improved method for producing a marbleized cheese.

Briefly, the invention contemplates the preparing of cheese rations by mixing together a first quantity of ripened and melted cheese paste and a second quantity of cheese that is ripened to a greater degree, both quantities of cheese having previously been deprived of mould. The quantities of cheese are left in contact with each other so that the heat of the first quantity pasteurizes the added second quantity. The mixture is fed in semi-fluid state through dosing passages having injecting nozzles opening longitudinally therein. A mould is fed through the injecting nozzle to form veins in the stream cheese flowing through the dosing passages, the streams being transversely cut to deflect and disburse the resultant veins therein. The product can then be formed into individual portions of the thus treated cheeses.

Advantageously the invention provides for the production of cheese rations in such a manner as to maintain unaltered the organoleptic and physical characteristics of the cheese which is processed.

Moreover, the invention provides for integrating in a cheese body distinctive veins which are preferably of a different color so as to give the cheese distinctive characteristics.

Moreover, the invention provides a process whereby it is possible to obtain small cheese rations having distinctive veins and this distinguishes from known methods wherein, due to the action of heat and mixing, the veins have been dissolved within the paste being treated.

Apparatus for effecting the method of the invention will next be described in detail with reference to the accompanying drawing in which the sole figure illustrates a device for involving veins of a mould with a cheese paste which is to constitute the cheese body.

The installation shown in the drawing comprises a hopper 1, one first passage chamber 2, and a second passage chamber 3, to which are connected two or more conduits 9, leading into an outlet chamber 10 terminating with a nozzle 6 opening above a rotating plate 7 which is fitted, along its circumference, with a certain number of dies 11, wherein the paste of finished green filament cheese settles in order to take on the required shape of small cubes or prisms. Behind the second passage chamber 3 is arranged a cylinder 4 wherein is positioned a piston 12 that closes the back end of the cylinder, while the opposite end is closed by a wall 13 having orifices 14 open into conduits 15 that penetrate in axial direction into the conduits 9 that connect second chamber 3 with the outlet chamber 10.

Opposite the mouths of conduits 9 and of conduits 15, which are coaxial with conduits 9, there is provided a cutting tool 5 which is driven by a shaft 16 to which is connected a hand wheel 17. The latter can be replaced by a mechanical driving mechanism. Cylinder 4, wherein pressure piston 12 moves, is fed by a hopper 8, wherein the green organic substance is placed as extracted from ripe green filament cheese or obtained from organic particles whereon moulds have been developed that are similar to those contained in the green filament cheese.

Into hopper 1 there is introduced the white paste of the green filament cheese, part of which has been made previously molten according to standard melting practice. The other part is pasteurized by the heat of the molten paste, that, going through chamber 2, enters into chamber 3 from which it passes, while cooling, towards the exit through conduits 9 surrounding injector nozzles 15. At the same time, the green organic substance that is contained within hopper 8 and cylinder 4 is pressed by piston 12 and injected into the flow of the half-fluid paste coming out of conduits 9 and going towards the cutting tool 5. This half-fluid paste fills suitable dies on the turning plate. By this arrangement, each cheese ration will have peculiar internal green veins that characterize green filament cheese, the taste of which is well preserved and is quite different from that of the white paste representing the greater part of the cheese.

The quantity of green organic substance that is injected, as compared with the volume of the finished cheese ration can be varied at will by regulating the pressure upon piston 12.

What I claim is:

1. A process for the production of individual portions of a cheese paste marbleized with green mould filaments, comprising the steps of melting a first quantity of cheese paste that has been previously partially ripened and deprived of mould, adding a second quantity of cheese that has been previously ripened to a higher degree and also deprived of mould, mixing and shaking together said melted first quantity and said second quantity and leaving said first and second quantities in contact with each other for a period of time sufficient to achieve pasteurizing of said added second quantity by the heat from said melted first quantity, thereby preserving the flavor of the starting cheese paste, feeding the mixture, in semi-fluid state, through dosing passages having injecting nozzles opening longitudinally therein, feeding mould through said injecting nozzles to form longitudinal mould veins in the stream of cheeses flowing through said dosing passages, transversely cutting the stream of cheeses having longitudinal mould veins to deflect and disperse the latter within the stream of cheeses, and pouring individual portions of the thus treated cheeses into molding dies for shaping said portions.

2. Individual portions of a cheese paste marbleized with green mould filaments and prepared according to the process of claim 1, so that the mould veins which are deflected and dispersed in the mixture of starting cheeses form marbleizations of well defined profile while retaining the natural physical and organoleptic properties of the starting cheeses.

References Cited in the file of this patent

UNITED STATES PATENTS

| 2,025,544 | Mitchel et al. | Dec. 24, 1935 |
| 2,358,526 | Mitchel et al. | Sept. 19, 1944 |
| 2,568,491 | Edwards | Sept. 18, 1951 |

FOREIGN PATENTS

| 9,550 | Great Britain | 1904 |
| 692,055 | Great Britain | May 27, 1953 |